June 21, 1932. M. VANDERKLOOT 1,863,609

MEAT MOLD

Filed June 19, 1931

Marinus Vanderkloot
INVENTOR.

BY Roy W. Johns.
ATTORNEY

WITNESS-

Patented June 21, 1932

1,863,609

UNITED STATES PATENT OFFICE

MARINUS VANDERKLOOT, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

MEAT MOLD

Application filed June 19, 1931. Serial No. 545,380.

The invention relates to improvements in meat molds.

The object of the present invention is to improve the construction of meat molds and to provide a rectangular meat mold adapted to press the meat product into rectangular shape by first applying spring pressure to the top of the meat, and then applying spring pressure either simultaneously or successively to both ends of the meat while maintaining the spring pressure upon the top of the meat.

A further object of the invention is to provide a meat mold of this character equipped with means for maintaining the springs of the end pressing means compressed while the means for applying spring pressure to the top of the meat is operating prior to applying spring pressure to the ends of the meat and to enable the springs of the end pressing means to be readily released for exerting spring pressure on the ends of the meat after the latter has been subjected for a period of time to the action of the top spring pressing means.

With these and other objects in view, the invention consists in the construction and novel combination and arrangement of parts hereinafter described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

In the drawing:—

Figure 1:
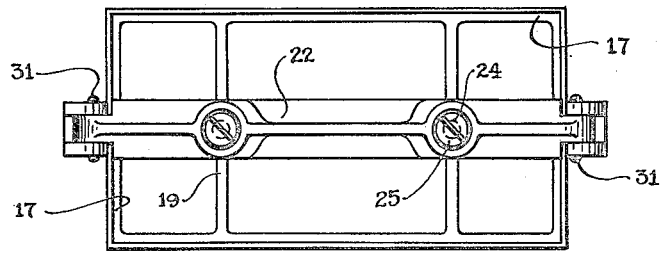
Figure 1 is a plan view of a meat mold constructed in accordance with this invention.

In the accompanying drawing in which is illustrated the preferred embodiment of the invention, 1 designates the body of the meat mold constructed of sheet metal or other suitable material, and open at the top and composed of vertical side walls, a horizontal bottom wall 2, and end walls 3. The body of the mold is round at its lower longitudinal corners 4 at the juncture of the bottom and side walls to facilitate cleaning the mold.

Within the mold is arranged a pair of vertical end pressing plates 5 conforming to the configuration of the mold and to a top pressing plate 6, and each provided at its outer face with a bearing collar 7 receiving an annular flange or head 8 of a shaft 9.

The shafts 9 extend outwardly from the end pressing plates through openings 10 in the end walls 3 of the mold and they are adapted to be drawn outwardly to compress coiled springs 11 surrounding the shafts and interposed between the outer faces of the end pressing plates 5 and the end walls 3 of the mold.

The inner ends of the horizontal coiled springs 11 are centered on the bearing collars 7 which are countersunk at their inner faces to provide bearing recesses 12 around their openings to receive the heads or flanges of the inner ends of the shafts 9. The outer ends of the coiled springs 11 are centered on collars 33 secured to the inner faces of the end walls of the body of the mold. The outer ends of the shafts are provided with handles 13 consisting of tapered pins inserted in transverse openings in the outer ends of the shafts. The openings 10 in the end walls of the mold have extensions or notches 14, and the shafts are provided intermediate of their ends with pin latches 15 consisting of pins secured in perforations of the shafts and projecting laterally from opposite sides thereof and adapted when arranged in alignment with the opposite notches or extensions 14 of the opening 10 to be drawn through the same. The notches 14 and the openings 10 form passageways through the end walls of the body of the mold and when the pin latches have been drawn outwardly through the passageways the shafts are partially rotated to carry the pin latches out of alignment with the notches to cause the pin latches to engage the outer faces of the end walls for holding the springs compressed.

When it is desired to apply spring pressure to the ends of the meat, the shafts are partially rotated to carry the pin latches into alignment with the recesses 14 of the passageways through the end walls of the mold. This will permit the springs to expand and will cause the end pressing plates to apply spring pressure to the ends of the meat. By means of the separate springs, shafts and pin latches, the spring pressure may be applied to the ends of the meat either successively or simultaneously. Also, the spring latches are adapted to hold the springs of the end pressing plates compressed while spring pressure is applied to the top of the meat by the top pressing plate.

The top pressing plate which is provided with a cup-shaped lower face 16 is reinforced at its upper face by a marginal rib 17 and longitudinal and transverse ribs 18 and 19, and it is provided at the juncture of the longitudinal and transverse ribs with vertical tubes 20, preferably formed integral with the top pressing plate and centering the lower ends of vertical coiled springs 21 which are interposed between the top pressing plate and the locking bar 22. The locking bar is provided at its lower face with depending annular bosses 23 for centering the upper ends of the coiled springs 21, and it has vertical openings 24 through which pass vertical screws or bolts 25 having heads at their upper ends countersunk in the annular enlargements of the upper face of the pressing plate. The lower ends 26 of the bolts or screws extend through the vertical tubes 20 and are threaded into the top pressing plate. These bolts or screws which are slidable in the openings of the locking bar form guides for permitting relative movement of the top pressing plate and locking bar, and limit the separation of the same.

Figure 2:
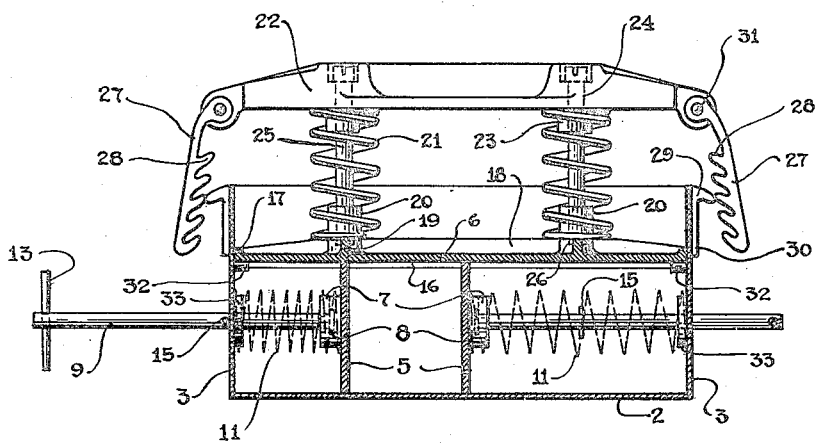
Fig. 2 is a longitudinal sectional view of the same, one of the end springs being pin latched in a compressed condition.
Figures 3, 4:
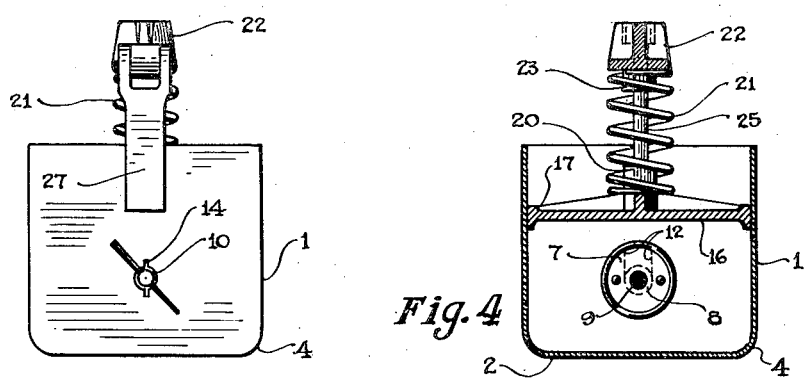
Fig. 3 is an end elevation of the meat mold.
Fig. 4 is a transverse sectional view of the meat mold.

The ends of the locking bar are adjustably connected with the body 1 by means of hook bars 27 provided at their inner faces with a longitudinal series of teeth 28 forming ratchet members and adapted to engage lugs or teeth 29 of end hooks 30 welded or otherwise secured to the outer faces of the end walls of the body 1 at the top thereof, as clearly illustrated in Fig. 2 of the drawing. The hook bars are hinged to the ends of the locking bar by pintles 31 and are adapted to swing into and out of engagement with the lugs or teeth of the end hooks 30. The hook bars and the end hooks provide adjustable connections between the locking bar and the body 1 of the mold for regulating the spring pressure of the top pressing plate, and the downward movement of the top pressing plate is limited by lugs 32 welded or otherwise secured to the inner faces of the end walls of the body of the mold at the upper portions of the said ends walls. These lugs are adapted to support the top pressing plate in close proximity to the upper edges of the end pressing plates to permit a close sliding contact between the end pressing plates and the top pressing plate without the spring pressure of the top pressing plate interfering with the action of the horizontal springs on the end pressing plates and the pressure exerted by the same on the ends of the meat.

The meat product is pressed into rectangular shape by first applying spring pressure to the meat by the top pressing plate which presses firmly against the meat. Prior to applying the spring pressure to the top of the meat, the springs of the end pressing plates are compressed and latched in their compressed condition.

The spring pressure is then applied to the top of the meat, and while maintaining a spring pressure upon the top of the meat, the pin latches are turned, thereby releasing the spring actuated end pressing plates so that the meat is under direct spring pressure from the top and both ends of the meat.

The meat when cooked or chilled assumes a rectangular shape, the cross section or thickness of which is fixed, and the height is variable, depending upon the weight of the piece of meat and the spring pressure applied to the ends. The cross section or thickness of the meat can be controlled and made larger or smaller by increasing or decreasing the area of the end plates.

What is claimed is:

1. A meat mold of the class described, comprising a body open at the top, a top pressing plate forming a cover for the body and arranged within the same, means for applying spring pressure to the top pressing plate, end pressing plates arranged within the body, springs for independently urging each of the end pressing plates inwardly for applying spring pressure on the ends of the meat, and means for holding the springs of the end pressing plates compressed while spring pressure is being applied by the top pressing plate.

2. A meat mold of the class described, comprising a body open at the top, a top pressing plate, end pressing plates located within the body beneath the top pressing plate, and means located in the path of the top pressing plate for limiting the downward movement thereof and to position the top pressing plate adjacent the upper edges of the end pressing plate to permit the latter to have a free sliding contact with the top pressing plate.

3. A meat mold of the class described, comprising a body open at the top, a top pressing plate, end pressing plates located within the body beneath the top pressing plate, lugs projecting horizontally from the body at the ends thereof, and located in the path of the top pressing plate and limiting the downward movement thereof and to position the top pressing plate adjacent the upper edges of the end pressing plate to permit the latter to have a free sliding contact with the top pressing plate.

4. A meat mold of the class described, including a body open at the top and having side, bottom and end walls, the end walls being provided at their upper portions with rigid horizontally aligned lugs, a top pressing plate arranged within the body above the said lugs and limited in its downward movement by the same, end pressing plates arranged within the body below the top pressing plate and having a sliding contact at their upper edges with the top pressing plate when the latter is seated upon the said lugs, means for applying spring pressure to the top pressing plate, shafts connected with the end pressing plates and extending outwardly through the end walls of the body, springs surrounding the shafts and interposed between the end pressing plates and the end walls of the body for exerting spring pressure on the ends of the meat, said springs being adapted to be compressed by the outward movement of the shafts, and latches for locking the shafts to the end walls of the body for holding the springs in a compressed condition.

Signed at Chicago, in the county of Cook and State of Illinois, this 17th day of June, 1931.

MARINUS VANDERKLOOT.